United States Patent [19]

Marino et al.

[11] Patent Number: 4,875,764
[45] Date of Patent: Oct. 24, 1989

[54] ASSEMBLY FOR CORRECTION OF DISTORTIONS OF A MIRROR

[75] Inventors: Philip F. Marino, Rochester; Donald E. Vandenberg, Brockport, both of N.Y.

[73] Assignee: Eastman Kodak Company, Rochester, N.Y.

[21] Appl. No.: 225,901

[22] Filed: Jul. 29, 1988

[51] Int. Cl.$^4$ ............................................. G02B 7/18
[52] U.S. Cl. ................................... 350/611; 350/487; 350/607
[58] Field of Search ............... 350/611, 360, 487, 607, 350/609, 613, 616, 631, 632, 633

[56] References Cited

U.S. PATENT DOCUMENTS

| | | | |
|---|---|---|---|
| 4,091,274 | 5/1978 | Angelbeck et al. | 350/611 |
| 4,601,553 | 7/1986 | Pepi et al. | 350/611 |
| 4,601,554 | 7/1986 | Plante et al. | 350/611 |

OTHER PUBLICATIONS

Pearson et al., "Active Optics Correction of Thermal Distortion of a 1.8 Meter Mirror", *Optical Engineering*, vol. 27, No. 2, Feb. 1988, pp. 115–122.

Henderson et al., "System Performance of a Large Deformable Mirror Using Differential Ball Screw Actuators", *SPIE vol. 179 Adaptive Optical Components II*, 1979, pp. 51–60.

Hardy, "Active Optics", *Proceedings of the IEEE*, vol. 66, No. 6, Jun. 1978, pp. 651–697.

Primary Examiner—Rodney B. Bovernick
Assistant Examiner—Martin Lerner
Attorney, Agent, or Firm—Stephen C. Kaufman

[57] ABSTRACT

An assembly that can provide corrections of distortions of a mirror. The assembly uses the method of active optics to apply forces to the mirror to introduce deformations that cancel out the distortions. An important feature of the assembly is the employment of a force actuator which comprises a closed feedback loop that closes around the force actuator. An advantage of this novel feature is that, in response to a disturbance to the force actuator, the feedback loop can maintain a desired controlled force for application to the mirror.

24 Claims, 3 Drawing Sheets

ASSEMBLY FOR CORRECTION OF DISTORTIONS OF A MIRROR

CROSS-REFERENCE TO A RELATED APPLICATION

This application is related to a copending and commonly assigned patent application Ser. No. 07/226,339 filed July 29, 1988 to Vandenberg et al. which is being filed contemporaneously with this application. The entire disclosure of the copending application is incorporated by reference herein.

BACKGROUND OF THE INVENTION

1. Field of the Invention

This invention relates to an assembly that can provide corrections of distortions of a mirror.

2. Introduction to the Invention

It is well known to employ a mirror as an important component of an optical system, for example, a telescope. To this end, it is desirable that the surface accuracy of the mirror should have an optimal optical quality. For example, it is desirable that the optical quality of the mirror should not be unduly compromised by mirror shape distortions due to, e.g., thermal distortions, material inhomogeneities or stress relaxation, or errors in support forces. One method of compensation for this possible fall off in optical quality is to apply forces to the mirror, thus introducing deformations that cancel out the accumulated errors. This method is referred to as active optics. For details on active optics, reference may be made for example to R. N. Wilson, F. Franza and L. Noethe, "Active optics I: a system for optimizing the optical quality and reducing the costs of large telescopes, J. Modern Opt. 34(4) 485-509 (1987); J. H. Hardy, "Active optics—don't build a telescope without it!" in International Conference on Advanced Technology Optical Telescopes, G. Burbidge and L. D. Barr, eds., Proc. SPIE 332, 252-259 (1982); and F. B. Ray and T. Y. Chunt, "Surface analysis of an actively controlled telescope primary mirror under static loads," Appl. Opt. 24(4), 564-569 (1985). The disclosure of each of these references is incorporated by reference herein.

SUMMARY OF THE INVENTION

It has been proposed to use active optics in conjunction with the setup disclosed in Pearson et al., "Active optics correction of thermal distortion of a 1.8 meter mirror", Optical Engineering, Vol. 27, No. 2 (115-122), Feb. 1988. The Pearson et al. setup is shown in FIG. 1, and includes a mirror 10 that is supported from a base structure 12 by way of a plurality of position actuators 14. The setup further includes a plurality of force actuators 16 which can apply forces to the mirror 10 in accordance with the method of active optics disclosed above. In one embodiment, the Pearson et al. setup can gather optical test information on the mirror 10 by way of a camera 18. The test information may be used as an input to a control system 20 on a quasi-real-time basis. The camera 18 and the control system 20 define a closed feedback loop 22. The control system 20 can determine a set of force commands to correct the predicted mirror 10 distortions, and input this information to the force actuators 16.

We have extended the work of Pearson et al. in the following way. First, we have recognized that the FIG. 1 setup may respond to deleterious changes to the mirror 10, be they mirror shape changes or mirror support changes (for example, changes in the base structure 12 or the position actuators 14 by way of the feedback loop 22 that closes on the camera 18 and control system 20. As a shorthand, we can say that the Pearson et al. setup may respond to changes by closing about the "sensing means", i.e., the camera 18 and control system 20. This type of response can imply the following. Assume that the Pearson et al. setup is subjected to deleterious changes to the mirror 10 by way of changes to the mirror shape directly, or changes to the position actuators 14, the base structure 12, or the force actuators 16. Then, if Pearson et al. close about the sensing means, it is essential that the sensing means in fact be in place and be operation, for it is a necessary vehicle to sense the putative changes, for ultimate instruction to the force actuators 16. Restated, we have recognized that, in this context, Pearson et al. must close about the sensing means, as there is no disclosed capability for closing, e.g., about the position actuators 14, or the force actuators 16.

We have found that this situation of being able to close only about the sensing means may derogate from the stated objective or preserving a desired optical quality of the mirror 10. For example, we are working with optical systems that may be used in adverse or unusual environments like orbiting space capsules, where it is not possible or advantageous to continually power a sensing means. Further, even with the Pearson et al. sensing means in place, changes can be accounted for and corrected only on a quasi-real-time basis (see Pearson et al. op. cit. p. 115). This means that once the Pearson et al. control system 20 determines a first desired force command, it can re-evaluate and update a second desired force command only after an arbitrary and unspecified time period has elapsed. Moreover, during this unknown time period, the force actuators 16 can respond nevertheless to any disturbances affecting the interconnected mirror 10, base structure 12, position actuators 14 and the force actuators 16 themselves, and they do so by applying arbitrary and possibly incorrect forces to the mirror 10.

We have recognized that the Pearson et al. setup can ultimately remedy this last deficiency, by re-initiating a sensing means cycle, closing on the sensing means, and computing an updated force command. But this procedure, in turn, conflicts with the situations noted above, where it is not possible or advantageous to continuously power the sensing means.

The present invention provides an assembly that can reconcile the conflicting demands of (a) employing a sensing means on a quasi-real-time basis, (b) yet at the same time, continuously controlling the forces applied to the mirror in such a way that any disturbances affecting the interconnected mirror, base structure, position or force actuators in the time period between sensing means updates, cannot result in the misapplication of forces to the mirror.

The present invention, accordingly, provides an assembly comprising:

(a) a base structure;
(b) a mirror;
(c) at least one position actuator for positioning the mirror with respect to the base structure; and
(d) at least one force actuator, each of which force actuators can generate a desired controlled force for application to the mirror, and wherein each force actuator comprises a closed feedback loop that closes around the force actuator, so that, in response to a disturbance to the force actuator, the feedback loop maintains the desired controlled force.

An important advantage of the present invention is that the feedback loop maintains the desired controlled force in response to a disturbance to the force actuator, as recited, and that the disturbance to the force actuator may include perturbations to at least one of the mirror, the base structure, the or each position actuator and an internal component of the force actuator. For example, we have been using new, lightweight resilient materials like a graphite/epoxy composite as a preferred base structure. This has enabled us, along with other factors, to design and build flexible, lightweight mirrors. At the same time, these flexible mirrors may be susceptible to unwanted perturbations, which perturbations may be accommodated by the feedback loop. Further, our designs include segmenting the mirror. The segments may be attached to sum to a very large mirror. We have observed that this action of manufacturing the mirror segments and attaching them into the very large mirror, may introduce, for example, manufacturing and/or curvature errors in the completed mirror. These errors, in turn, may be realized as a disturbance to the force actuator by way of a perturbation to the base structure and/or mirror, and are therefore readily accommodated by the feedback loop. Also, we note that accidental or deliberate changes to the or each position actuator, for example, a deliberate change in the position of a position actuator so as to give the mirror a desired tilt, may be readily accommodated by the feedback loop, so that the force actuator maintains the desired controlled force. Finally, we note that the feedback loop can accommodate undesirable perturbations internal to the force actuators themselves. For example, a force actuator may be subjected to thermal gradients or mechanical shocks, which, in the absence of the feedback loop, could result in the force actuator producing an inappropriate output.

We now turn to preferred aspects of the assembly of the invention.

The base structure preferably is an elongate, monolithic element, and as indicated preferably comprises a graphite/epoxy composite. The base structure may comprise an elongate element whose coefficient of thermal expansion is from 0.0 ppm/°C to ±100 ppm/°C.

The mirror preferably is an elongate, flexible conventional mirror. The mirror preferably comprises a fused silica borosilicate glass composition. The mirror may have a coefficient of thermal expansion so that without the controlled force for application to the mirror, the thermal distortion of the mirror in, for example, a telescope environment, does not compromise the accuracy of the mirror. Nevertheless, our assembly can accommodate mirrors that have a coefficient of thermal expansion of as large as ±100 ppm/°C.

The position actuator preferably comprises a rigid, fixed member made of a thermally stable material. The position actuator may act directly on the back surface of the mirror, or may act on a tab structure which is fixed to an edge of the mirror. For a high performance application, we have found that the position actuator preferably provides an accuracy, repeatability and stability on the order of 1.0 microinch.

The force actuator preferably comprises a first flexure, for example, a linear spring; a first means to drive the first flexure, for example, a lead screw which comprises means to transform rotary action into linear action; a mirror flexure driven by the first flexure, which mirror flexure can apply the desired controlled force to the mirror; and a force transducer which transforms information about the first flexure into an electrical signal, for example, the linear displacement of the first flexure transformed to a voltage signal. The force actuator preferably is designed so that it is manifestly a low spring-rate device to low frequency and static disturbances, and a stiff or highly damped device to high-frequency disturbances. The design helps maintain a desired dynamic stability for a flexible mirror, while not compromising its optical performance.

The closed feedback loop preferably comprises the force actuator; a motor which can drive the first means (e.g., the lead screw); and a control system. The control system preferably inputs information A on the desired controlled force for application to the mirror; inputs the electrical signal outputted by the force transducer as information B; and on the basis of information A and information B, controls the operation of the motor. The control system may comprise a microprocessor.

The assembly of the invention may further comprise a sensing system for providing a set of parameters that correspond to optical distortions of the mirror, and a computation device. The computation device acts on the set of parameters and computes the desired controlled force that can cancel out accumulated errors to the mirror.

BRIEF DESCRIPTION OF THE DRAWING

The invention is illustrated in the accompanying drawings in which.

DETAILED DESCRIPTION OF THE INVENTION

Figure 1:
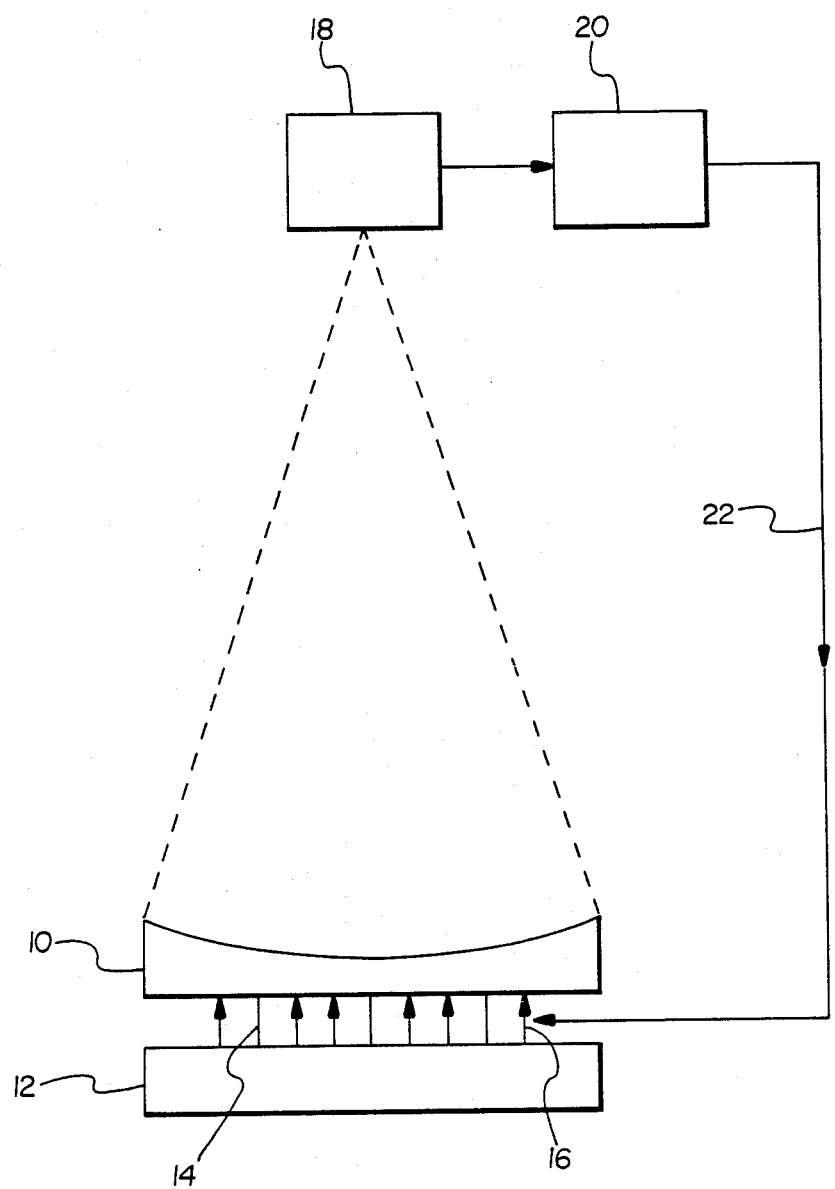
FIG. 1 shows an active optics setup.
Figure 2:
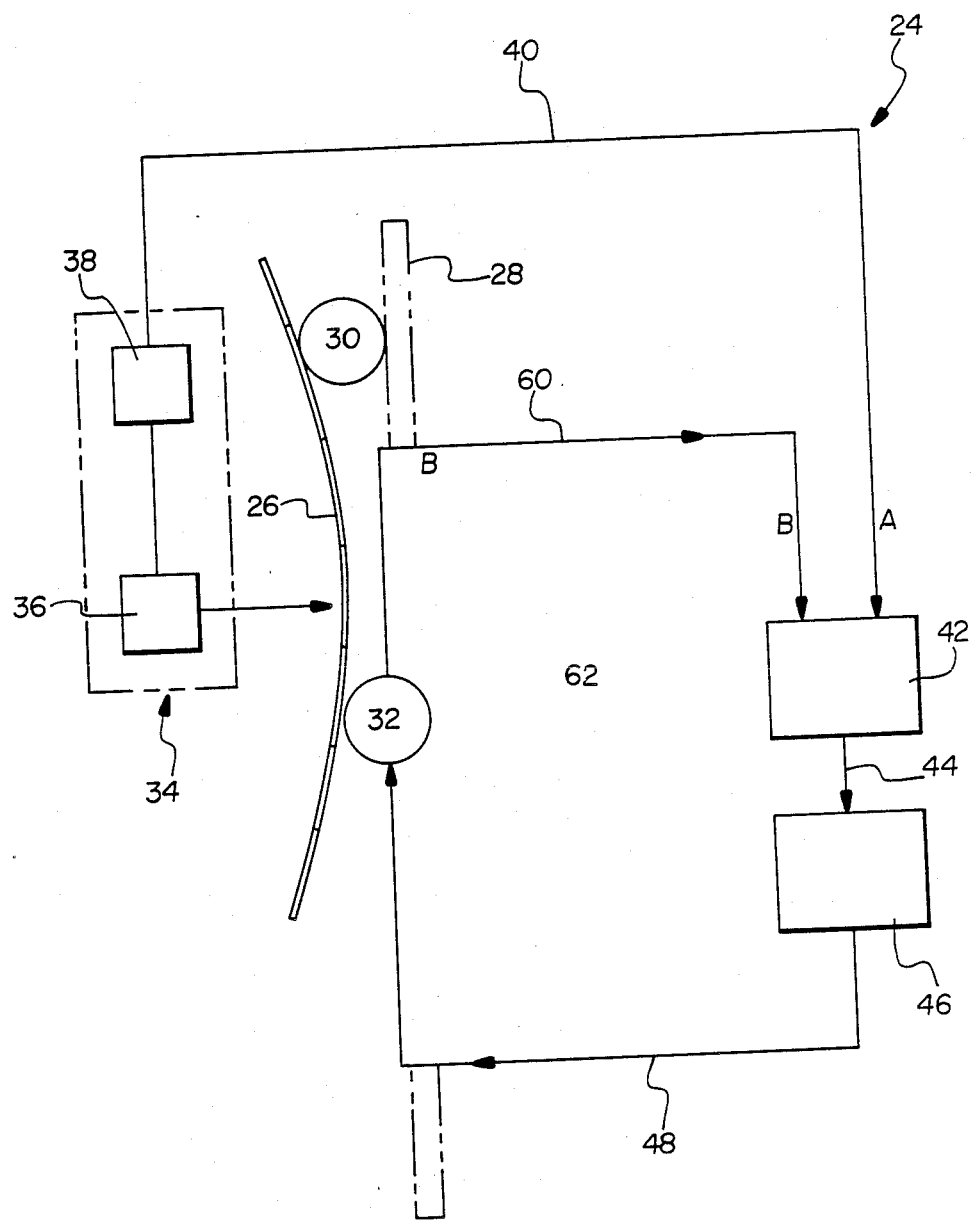
FIG. 2 shows an assembly of the present invention.
Figure 3:
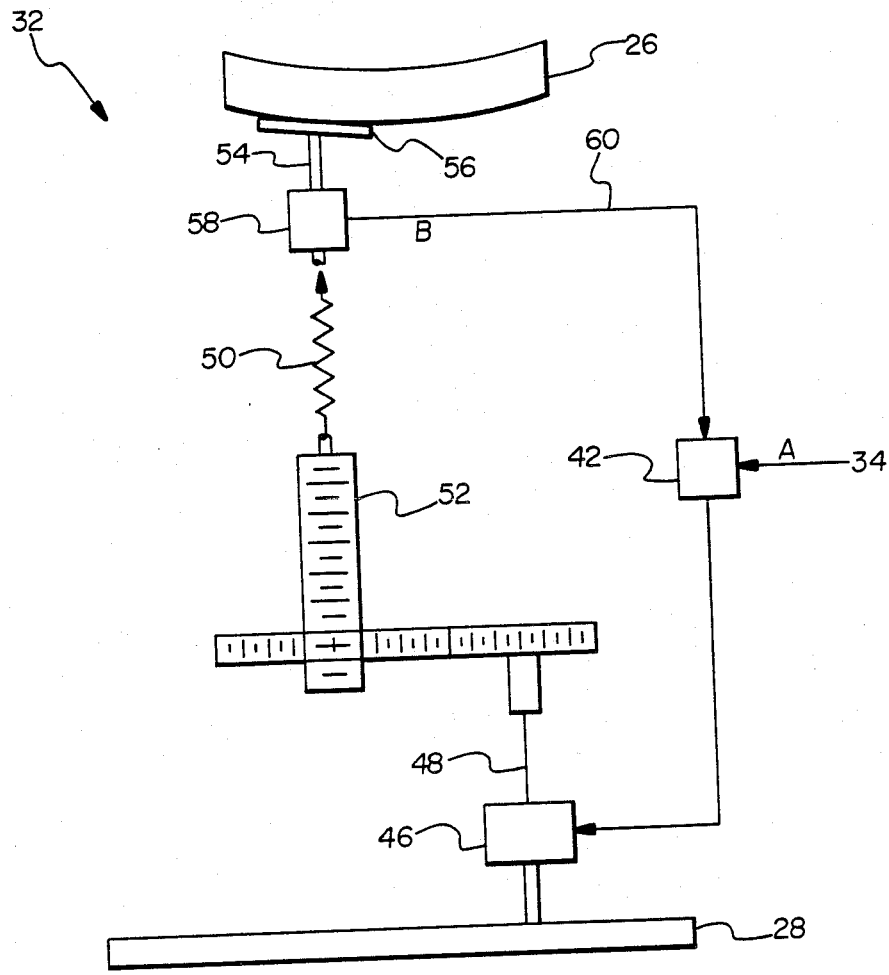
FIG. 3 shows a closed feedback loop and a force actuator that may be used in the assembly of the present invention.

Attention is now directed to FIGS. 2 and 3, which show an assembly 24 of the present invention. The assembly 24 comprises a mirror 26 that is supported from a base structure 28 by way of a plurality of position actuators 30. In particular, the mirror 26 is segmented, and each mirror segment comprises a fused silica composition. The base structure 28 comprises a monolithic structure, and the position actuators 30 comprise rigid, fixed members. The assembly 24 also includes a plurality of force actuators 32, located between the mirror 26 and the base structure 28. The force actuators 32 can generate a desired controlled force for application to the mirror 26.

An instruction to the force actuator 32 to generate the desired controlled force is provided in the following way. The assembly 24 includes a sensing means 34 that comprises a camera 36 and a computation device 38. The camera 36 and the computation device 38 cooperate to generate the desired controlled force. Excellent results to this end may be realized in accordance with either the Pearson et al. disclosure referenced above, or a preferred Method For Corrections Of Distortions Of A Mirror, disclosed in the above referenced patent application Ser. No. 07/226,339. Both of these disclosure are incorporated by reference herein.

Continuing, the desired controlled force generated by the sensing means 34 is outputted along a line 40 as a subsequent input of information A to a control system 42. The control system 42, in turn, based on the rotary motor 46 to drive, by way of a line 48, the force actuator 32 in accordance with the information A.

FIG. 3 shows the details of the force actuator 32 used in the assembly 24. The force actuator 32 comprises a first flexure 50 which is a soft spring; a leadscrew and nut 52 which transform the rotary action of the motor 46 into a linear action to drive the first flexure 50; a mirror flexure 54 which applies the desired controlled force to the mirror 26 by way of a mount pad 56; and a force transducer 58 which transforms information about the force of the mirror flexure 54 as information B outputted along a line 60 of the control system 42.

The operation of the assembly 24 is now disclosed. The control system 42, based on the information A generated by the sensing means 34, instructs the motor 46 to act to displace the first flexure 50 a distance $\Delta X$ in response to the desired force command. This action results in the mirror flexure 54 applying the desired force to the mirror 26. At the same time, the force transducer 58 provides the information as to the force F of the mirror flexure 54 to the control system 42 along the line 60.

Assume, now, that a disturbance to the force actuator 32 must be absorbed due to a perturbation of at least one of the mirror 26, the base structure 28, the position actuator 30, or the force actuator 32 itself. Then, the disturbance induces an undesirable force $\Delta F$ in the mirror flexure 54. The force $\Delta F$, however, is monitored by the force transducer 58, and sent along the line 60 to the control system 42 as information B. The control system 42, accordingly, compares the information B, to its previous information A inputted along the line 40 from the sensing means 34. On the basis of this comparison, the control system 42 controls the output of the motor 46 to compensate for the undesired tendency of $F \rightarrow \Delta F$. In sum, the assembly 24 closes a loop 62 about the force actuator 32, maintaining the mirror flexure 54 at the desired force F.

What is claimed is:
1. An assembly comprising:
   (a) a base structure;
   (b) a mirror;
   (c) at least one position actuator for positioning the mirror with respect to the base structure; and
   (d) at least one force actuator, each of which force actuators can generate a desired controlled force for application to the mirror, and wherein each force actuator comprises a closed feedback loop that closes around the force actuator, so that, in response to a disturbance to the force actuator, the feedback loop maintains the desired controlled force.

2. An assembly according to claim 1, wherein the base structure comprises a graphite/epoxy composite.

3. An assembly according to claim 1, wherein the base structure is elongate.

4. An assembly according to claim 1, wherein the base structure is monolithic.

5. An assembly according to claim 1, wherein the mirror is flexible.

6. An assembly according to claim 1, wherein the mirror comprises a conventional mirror.

7. An assembly according to claim 1, wherein the mirror comprises a light weight borosilicate glass composition.

8. An assembly according to claim 1, wherein the mirror comprises a fused silica composition.

9. An assembly according to claim 1, wherein the mirror is elongate.

10. An assembly according to claim 1, wherein the mirror is segmented.

11. An assembly according to claim 1, wherein the mirror has a coefficient of thermal expansion large enough so that without the desired controlled force for application to the mirror, the thermal distortion of the mirror in a telescope environment compromises the accuracy of the mirror.

12. An assembly according to claim 1, wherein the mirror has a coefficient of thermal expansion of as large as $\pm 100 \times 10^{-6}$ inch/inch/°C.

13. An assembly according to claim 1, wherein the or each position actuator(s) comprise(s) rigid, fixed members.

14. An assembly according to claim 1, wherein the or each position actuator(s) act directly on a back surface of the mirror.

15. An assembly according to claim 1, wherein the or each position actuator(s) act on a tab structure which is fixed to an edge of the mirror.

16. An assembly according to claim 1, wherein the or each force actuator comprises:
   (a) a first flexure;
   (b) a first means to drive the first flexure;
   (c) a mirror flexure driven by the first flexure, which mirror flexure can apply the desired controlled force to the mirror; and
   (d) a force transducer which transforms information about the mirror flexure into an electrical signal.

17. An assembly according to claim 16, wherein the first flexure is driven so that it operates in a linear regime.

18. An assembly according to claim 16, wherein the means to drive the first flexure comprises means to transform rotary action into linear action.

19. An assembly according to claim 16, wherein the force transducer transforms information about the linear displacement of the first flexure into a voltage signal.

20. An assembly according to claim 16, wherein the force actuator is a low spring-rate device to low frequency and static disturbances, and a highly damped device to high-frequency disturbances.

21. An assembly according to claim 16, wherein the closed feedback loop comprises:
   (a) the force actuator;
   (b) a motor which can drive the first means; and
   (c) a control system which
      (i) inputs information A on the desired controlled force for application to the mirror;
      (ii) inputs the electrical signal outputted by the force transducer as information B; and
      (iii) on the basis of information A and B, controls the operation of the motor.

22. An assembly according to claim 21, wherein the control system comprises a microprocessor.

23. An assembly according to claim 1, wherein the disturbance to the force actuator comprises perturbations to at least one of the base structure, the mirror, the or each position actuator(s); and an internal component of the force actuator.

24. An assembly according to claim 1, further comprising:
(a) a sensing system for providing a set of parameters that correspond to optical distortions of the mirror; and
(b) a computation device which acts on this set of parameters, for computing the desired controlled force, for compensating for the optical distortions, and for input to the force actuator.

* * * * *